United States Patent [19]
Dickenson et al.

[11] 3,743,244
[45] July 3, 1973

[54] TOP AND BOTTOM GATE VALVE FOR REMOVING AND REPLACING RENEWABLE SEATING ELEMENTS

[76] Inventors: Harvard G. Dickenson, 649 N. Waco, Tulsa, Okla. 74127; Charles R. Hoffman, 6758 S. 72nd E. Avenue, Tulsa, Okla. 74133

[22] Filed: Nov. 9, 1971

[21] Appl. No.: 196,980

[52] U.S. Cl............... 251/197, 251/199, 251/204, 251/327, 251/328
[51] Int. Cl............................................. F16k 3/18
[58] Field of Search............... 251/328, 204, 197, 251/199, 329, 327, 326

[56] References Cited
UNITED STATES PATENTS

| 3,194,259 | 7/1965 | Garrod............................ 251/328 X |
| 3,689,028 | 9/1972 | Dickenson et al.............. 251/329 X |
| 3,125,323 | 3/1964 | Heinen............................ 251/197 |
| 3,293,342 | 12/1966 | Grove............................. 251/327 X |
| 3,080,883 | 3/1963 | Allen.............................. 251/328 X |

*Primary Examiner*—Arnold Rosenthal
*Attorney*—Head & Johnson

[57] ABSTRACT

A gate valve designed so as to provide for removal and replacement of renewable seat elements without necessitating the disconnection of the valve body from piping or other associated equipment, this desirable feature made possible through openings in both the top and bottom portions of the valve body and the use of removable seating elements supported in a valve body having annular seating surfaces which encircle the fluid passageway through the body, a vertically positionable gate member which may be positioned in the valve body between opened and closed positions, when in the closed position the gate member contacting the seat element seating surface, and sealable, removable upper and lower cover plates which, when either is removed, will allow the removal and replacement of the renewable seating elements.

8 Claims, 5 Drawing Figures

Patented July 3, 1973 3,743,244
2 Sheets-Sheet 2
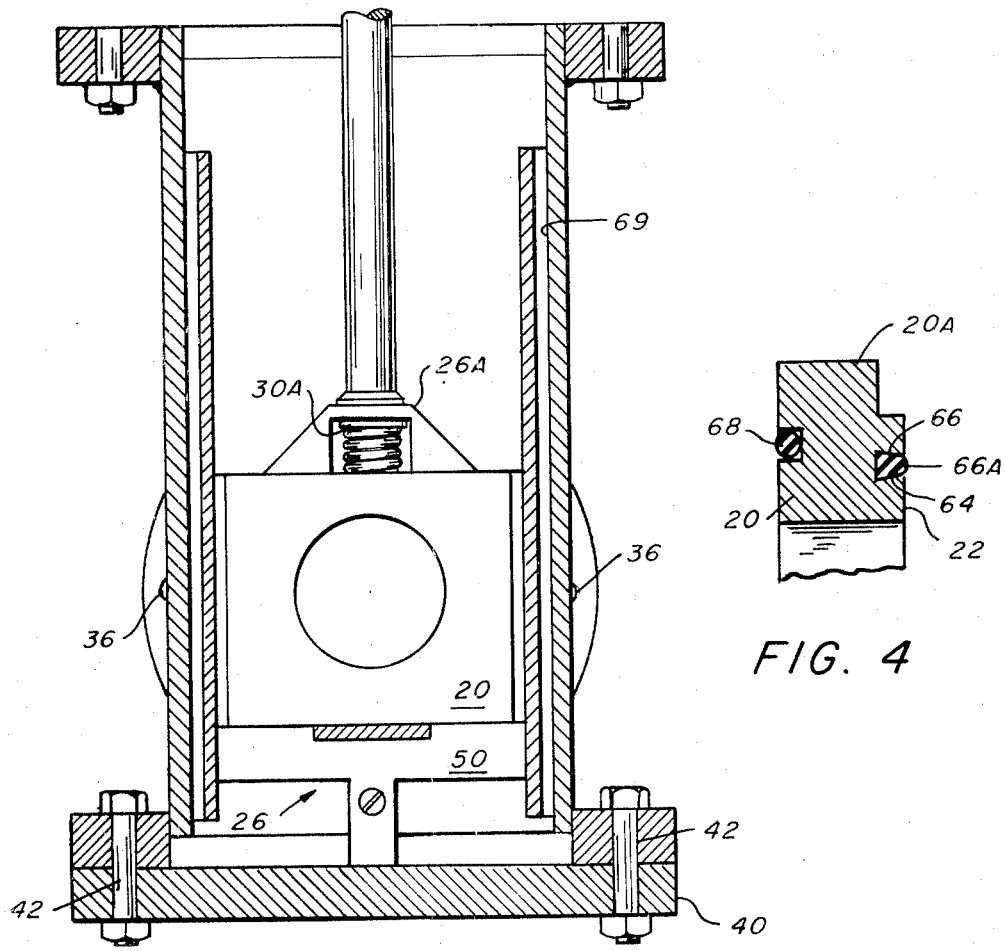
FIG. 2
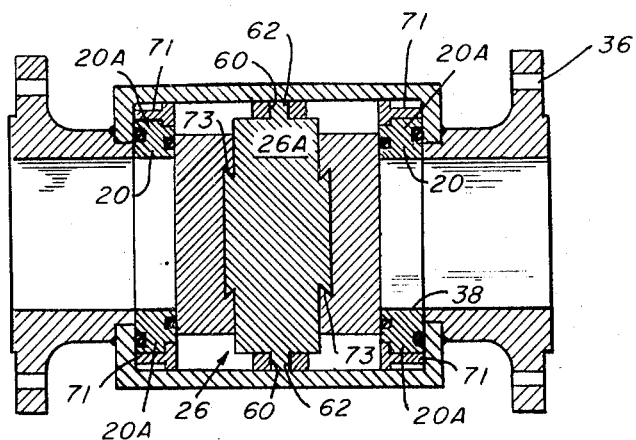
FIG. 4
FIG. 3

TOP AND BOTTOM GATE VALVE FOR REMOVING AND REPLACING RENEWABLE SEATING ELEMENTS

BACKGROUND, SUMMARY AND OBJECTS OF THE INVENTION

Devices known as gate valves have for many years been used for controlling fluid flow through conduits or pipes. The basic design normally associated with a gate valve would be a valve body bored with a fluid passageway and containing a gate member which may be positioned vertically either upward to achieve an open position or downward in a closed position thereby closing the gate and stopping the fluid flow. Most gate valve bodies are designed with connection features such as flanges, threaded openings, or weld ends which will allow the valve to be connected to tanks, pumps, or other piping devices designed for fluid flow. Inside the valve body are sealing surfaces which encircle the flowway and when the valve is put in the closed position the gate member is moved against the body sealing surface to stop the fluid flow through the valve.

When wear occurs to the body sealing surface, or gate member, leakage can occur. Such wear may be due to frictional engagement of the gate member with the seating surface as the gate members move into and out of closed position, or it may be due to abraisiveness of fluid flow through the valve. In some types of gate valves the body sealing surface or surfaces are formed integrally with the valve body. When wear occurs in such sealing surfaces to the point where the valve leaks excessively the entire valve must be replaced. In order to avoid the necessity of discarding an entire, valve removable seat elements are used. When the valve leaks excessively the old seat elements are removed and new ones inserted. However, the known method of replacing seat elements in gate valves requires the valves to be removed from the piping or other fluid conducting equipment to which they are affixed and the valves be dismantled. This is time-consuming and expensive since, when a valve is removed from its position in a pipeline or from connection with other apparatus, it is sometimes difficult to realign the piping and apparatus when the valve is repositioned.

It is an object of this invention to provide a gate valve including improved means of removing and replacing the seat elements or elements without the necessity of disconnecting the valve for piping or other apparatus.

More particularly, an object of this invention is to provide a gate valve having removable seat elements and including, in the valve body, a lower and upper opening and a plate sealably closing the lower and upper opening providing means whereby the valve seat elements may be removed through either opening and replaced without disconnecting the valve from piping or other apparatus.

These general objects, as well as more specific objects will be fulfilled by the apparatus to now be described in the following specification and claims, taken in conjunction with the drawings.

DESCRIPTION OF VIEWS

FIG. 2 is a cross-sectional view taken along the line 2—2 of FIG. 1B.

FIG. 3 is a cross-sectional view taken along the line 3—3 of FIG. 1B.

FIG. 4 is an enlarged cross-sectional view of a portion of the seat element incorporating an improved gasket means according to this invention.

DETAILED DESCRIPTION

Figures 1A, 1B:
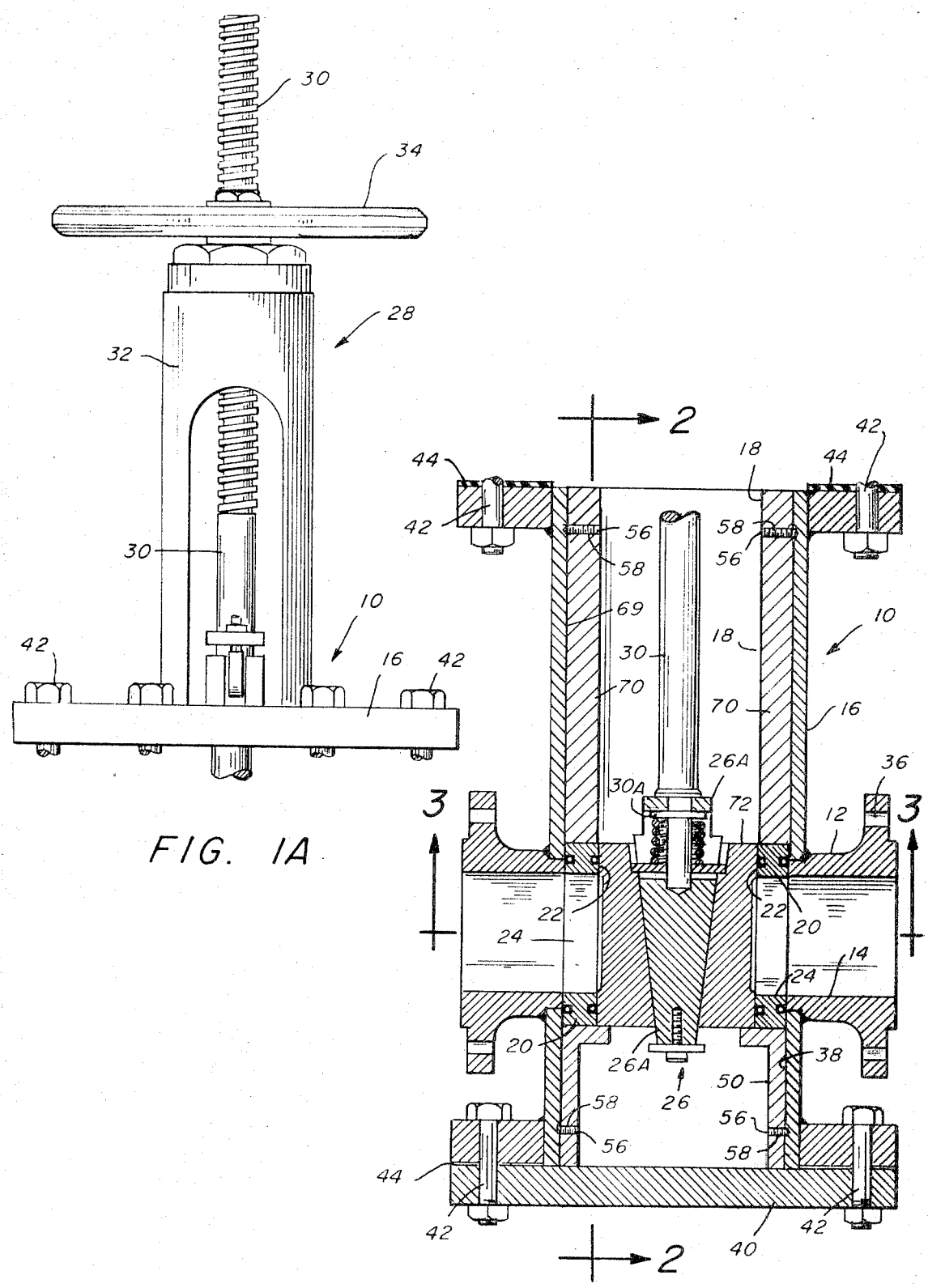
FIG. 1A is an external view of an upper portion of a typical gate valve.
FIG. 1B is the lower portion of the valve of FIG. 1A, the lower portion being shown in cross section and disclosing the improved means of replacing the valve seat elements according to this invention.

Referring to the drawings and first to FIGS. 1A and 1B a gate valve is shown incorporating this invention. FIG. 1A shows the upper portion of a gate valve generally indicated by the numeral 10 while FIG. 1B shows the lower portion of valve 10. The valve includes a body 12 having a flow passageway 14 therethrough. The body further includes an upper extending bonnet attachment portion 16 having a bonnet opening 18 therein.

Received in the lower body portion 12 are spaced-apart seating elements 20 each of which includes a seating surface 22. Each seating element 20 includes a flow passageway 24 therethrough which is coaxial with the flow passageway 14 through body 12, the seating surfaces 22 encircling the flow passageways 24. Positioned within the valve is a gate element, generally indicated by the numeral 26 which is movable between opened and closed positions. FIG. 1B shows gate element 26 in closed positions in which it engages body seating surfaces 22 to close the valve. When the gate member is displaced upwardly within the bonnet opening 18 the flow passageway 14 is unobstructed and fluid may flow easily through the valve.

The vertical position of gate member 26 is controlled by apparatus in the bonnet portion, generally indicated by the numeral 28. The specific means for raising and lowering gate 26 is not a part of this invention but, as is typical of gate valves in present general use, includes a stem 30, the upper portion of which is threaded and which passes through an opening (not shown) in a yoke 32. A handweel 34 is threadably received on the upper threaded portion of the stem 30 and serves, when rotated, to raise and lower the stem and thereby the gate member 26. The gate member, as best shown in FIG. 2, includes an upper extending portion 26A which rotatably receives the enlarged portion 30A of stem 30 to transmit the vertical motion of the stem to the gate member 26.

Body 12 is normally supported to piping or other equipment, such as by means of bolts which are received through openings 36 in the body flange portions. Other means are commonly provided for attachment of the valve to piping or other fluid handling apparatus.

The valve described up to this point is not unlike other known types of gate valves. However, most other known gate valves require the valve to be disassembled from piping or other equipment to which it is attached in order to replace the seat elements 20 when they become worn. This invention includes means whereby the seat elements 20 may be replaced without disconnecting the valve body from the piping or other apparatus.

In the lower portion of valve body 12 is a lower opening 38. A lower cover 40 normally sealably closes opening 38 and is held to body 12 such as by means of bolts 42. In the upper portion of valve body 12 is an upper opening 69. An upper bonnet attachment (cover plate)

16 normally sealable closes opening 69 and is held to body 12 such as by means of bolts 42. Gaskets 44 assures leakproof engagement of the upper and lower cover with the valves body.

Each of the seating elements 20 includes an extended lip portion 20A on the vertical sides. Body 12 includes four "T" bars 71, welded into the corners of the valve body 12, and having grooves and machined surfaces to receive the extended lip portion 20A of the seating elements 20.

Formed in the lower portion, under each seat element 20, are bottom seat retainers 50, and in like manner formed in the upper portion are top seat retainers 70. To further maintain the seat retainers in position set screws 56 extends into threaded recesses 58 in each of the four seat retainers. Set screw 56 serves to keep the seat rings 20 in proper position during attachment and removal of the lower plate 40 and upper plate 16, and further assures proper position of the seat rings in alignment with fluid passageway 14.

As shown best in FIG. 3 the body 12 includes opposed vertical grooves 60 which slidably receive paralleled boss portions 62 on the gate member 26 so that the gate member is retained in proper position between the seat elements as it is raised and lowered within the valve body.

In the illustrated embodiment the seat element seating surfaces 22 are parallel to each other and receive, therebetween, a wedge lock spreader assembly shaped gate element 26. This arrangement is preferred since the downward force applied to gate member 26 forces it into increased contact with the seating surface 22 by means of a lateral thrust. As wear to these elements occurs increased downward travel of gate 26 insures more positive sealing and compensation for the wear. Sealing discs 72 are slidably held to wedge lock spreader 26A, by means of mating dove tails 73, (see FIG. 3). The sealing discs 72 are immediately contracted laterally on initial vertical upward movement of stem 30 and wedge lock spreader 26A thereby removing any possibility of wear to the seat rings 20. It is understood however that in some gate valves the seating surfaces 22 are inclined to each other and receive, therebetween, an angular sided gate member and such would be within tge purview of this invention.

FIG. 4 shows an improved arrangement of the seat element 20 of the valve. The seating surface 22 is provided with an annular groove 64 in which is positioned an annular gasket member 66. While the gasket member 66 may be loosely fitted within the groove 64 the preferred arrangement, as illustrated, includes a resilient gasket member 66 bonded to the groove 64. A further preferred arrangement, as illustrated, includes the provision wherein the portion of the gasket member 66 extending beyond the seating surface 22 is of a reduced width compared to the groove 64, such reduced width portion being indicated by the numeral 66A. This protruding reduced width portion 66A causes the contact between the resilient gasket 66 and the gate member to have a higher pounds per square inch contact pressure compared to the arrangement wherein the protruding portion of the gasket member is of the same width as groove 64. Such increased contact pressure with the gate member results in improved leakproof seal with the same or a smaller amount of downward force applied to the wedge shaped gate member.

To insure leakproof engagement of the seat element 20 with the valve body an O-ring 68 may be provided in the seat element as shown in FIG. 4.

OPERATION OF THE INVENTION

When the valve becomes defective because of wear to the seat elements 20 it is not necessary to remove the valve from piping or other apparatus to which it is fixed. Instead, all the operator must do is to remove bolts 42 and thereby remove either cover 16 or 40. Gate member 26 is raised to an upward position wherein it is not contacting the seat elements 20 and the seat elements can then be removed from the valve by moving them directly downwardly and through the lower opening 38. New seat elements may then be reinserted into the valve body. To insure proper orientation of the seat elements seat retainers 50 and 70 are positioned in the lower and upper ends, set screws 56 serving to retain the seat ring in position. With the bottom cover in place and bolts 42 tightened the valve is back in operation. Thus the complete procedure for removing and replacing the seat elements in a gate valve is expeditiously accomplished and without the expense and time of removing the valve from its attachment to other apparatus.

While the invention has been described with a certain degree of particularity it is manifest that many changes may be made in the details of construction and the arrangement of components without departing from the spirit and scope of this disclosure. For instance, the valve has been defined as having an upper and lower portion and the gate member moving up and down. It can easily be seen that the valve would function in the same manner if turned upside down of the illustration, or to one side or the other. Such terms are used merely to assist in visualization of the description of the valve with the drawings and not to place limitation on the valve, or any component thereof. The invention described fulfills the objectives set forth in the beginning. The means of easily removable seats in a valve facilitates changing the trim of the valve. For instance, it is easy and inexpensive to change from a resilient seat valve to an all metal seat valve, or vice versa. If special metals or materials are required to handle certain liquids or gases, the valve is easily changed to accommodate such special conditions.

It is understood that the invention is not limited to the specific embodiment set forth therein but is to be limited only by the scope of the attached claim or claims, including the full range of equivalency to which each element thereof is entitled.

What is claimed:

1. A valve having improved means of removing and replacing the seat element without the necessity of disconnecting the valve from piping or other apparatus, comprising:

a valve body having a flow passageway therethrough, and upwardly extending bonnet attachment portion having a bonnet opening communicating with the fluid passageway, and an opening in the lower portion of the body opposite the bonnet attachment portion, the lower opening likewise communicating with the flow passageway, the valve body including means of attachment to other flow conducting apparatus, the body having paralleled seat retaining guides to each side of said flow passageway;

a seating element removably supported in the valve body having a flow passageway opening therein coaxial with the body flow passageway opening, the seating element having an annular seating surface surrounding the flow passageway, the seating element having extending lip portions on the opposite sides thereof slidably received in said body seat retaining guides;

a gate member vertically positionable in the valve body between a closed position in which said seating element seating surface is contacted, closing the valve against fluid flow therethrough, and open position in which said gate member is withdrawn upwardly within said bonnet opening permitting free passage of fluid through the valve;

means extending partially externally of the valve body of vertically positioning said gate member between opened and closed positions;

means removably retaining said seat in said seat retaining guides; and an upper removable cover plate sealably closing said upper opening and a lower cover plate removably covering said lower opening in said valve body, and permitting, when the said cover plate is removed from either one of said upper and lower openings, the removal and insertion of said seating element through the said one of said openings.

2. A valve according to claim 1 wherein said body has seat retaining guides to each side of said flow passageway on both sides of said body, including two seating elements removably supported in the valve body each having a flow passageway opening therein coaxial with the body flow passageway, the seating elements each being spaced apart from each other and each having an annular body seating surface surrounding the flow passageway, the seating elements receiving said gate member therebetween when said gate member is in closed position.

3. A valve according to claim 1 wherein said seating element seating surface has an annular groove therein, and including a resilient gasket member received in said groove and normally extending beyond said seating surface to engage said gate member as said gate member is moved to the closed position.

4. A valve according to claim 1 wherein said resilient gasket member is bonded to said groove in said seating element.

5. A valve according to claim 1 wherein said resilient gasket member has a cross-sectional configuration such that the portion extending normally beyond said seating element seating surface is of less width than said groove.

6. A valve according to claim 1 wherein said means of retaining said seat in said seat retaining guides includes seat retainers both above and below the seat ring whereby said seat ring is retained in proper position within the valve body.

7. A valve according to claim 1 wherein said gate member includes expanding means actuatable when the gate member approaches closed condition whereby said seating element annular seating surface is more securely contacted by said gate member.

8. A valve according to claim 2 wherein said gate member includes expanding means actuatable when the gate member approaches closed condition to more securely seal simultaneously against both said seat elements.

* * * * *